(12) United States Patent
Zhang et al.

(10) Patent No.: US 12,540,088 B2
(45) Date of Patent: Feb. 3, 2026

(54) BIOENHANCER BASED ON MOLYBDENUM DISULFIDE COMPOSITE MATERIAL, PREPARATION METHOD AND APPLICATION THEREOF

(71) Applicant: NANJING UNIVERSITY, Nanjing (CN)

(72) Inventors: Xuxiang Zhang, Nanjing (CN); Xinchun Ding, Nanjing (CN); Kailong Huang, Nanjing (CN); Depeng Wang, Nanjing (CN); Xiulin Zheng, Nanjing (CN)

(73) Assignee: NANJIN UNIVERSITY, Nanjing (CN)

( * ) Notice: Subject to any disclaimer, the term of this patent is extended or adjusted under 35 U.S.C. 154(b) by 0 days.

(21) Appl. No.: 19/193,892

(22) Filed: Apr. 29, 2025

(65) Prior Publication Data
US 2025/0376394 A1 Dec. 11, 2025

(30) Foreign Application Priority Data

Jun. 6, 2024 (CN) .......................... 202410727582.7

(51) Int. Cl.
*C02F 3/12* (2023.01)
*C02F 3/30* (2023.01)
*C02F 101/16* (2006.01)
*C02F 101/38* (2006.01)

(52) U.S. Cl.
CPC ................ *C02F 3/12* (2013.01); *C02F 3/305* (2013.01); *C02F 2101/16* (2013.01); *C02F 2101/38* (2013.01); *C02F 2209/02* (2013.01); *C02F 2209/44* (2013.01)

(58) Field of Classification Search
CPC .. C02F 3/12; C02F 3/305; C02F 3/303; C02F 3/108; C02F 3/10; C02F 2101/38; C02F 2209/02; C02F 2209/44; C20F 2101/16
USPC .................................................. 210/601, 623
See application file for complete search history.

(56) References Cited

U.S. PATENT DOCUMENTS

2007/0062864 A1 3/2007 Abe et al.
2021/0261449 A1* 8/2021 Miyake .................. C02F 3/303

FOREIGN PATENT DOCUMENTS

| CN | 106190896 A | 12/2016 |
| CN | 108191075 A | 6/2018 |
| CN | 109256546 A | 1/2019 |
| CN | 110818074 A | 2/2020 |
| CN | 104857976 A | 8/2025 |

OTHER PUBLICATIONS

Long et al, "controllable synthesis of MoS2/graphene low-dimensional nanocomposites and their electrical properties" Applied surface Science, 504, pp. 1-12 (Year: 2019).*
Cui et al "Preparation of MoS2 microspheres through surfactant-assisted hydrothermal synthesis using thioacetamide as reducing agent", Hydrometallurgy 164, pp. 184-188 (Year: 2016).*
Li et al, English machine translation CN 110818074, pp. 1-7 (Year: 2020).*
Zhao Wei et al., Preparation and Electrochemical Investigation of Graphene/Molybdenum Disulfide Composites Obtained by Hydrothermal Method, Journal of Shenyang University of Chemical Technology, Mar. 2019, vol. 33 No. 1.
The First Office Action for China Application No. 202410727582.7, Jul. 8, 2024.
The Notice of Grant for China Application No. 202410727582.7, Aug. 26, 2024.

* cited by examiner

*Primary Examiner* — Claire A Norris
(74) *Attorney, Agent, or Firm* — Fideli Law PLLC; Qiang Li

(57) ABSTRACT

The present application provides a bioenhancer based on a molybdenum disulfide composite material, and a preparation method and an application thereof. The main components of the molybdenum disulfide composite material include molybdenum disulfide and graphene, and a ratio of a mass of the molybdenum disulfide composite material to a volume of the activated sludge in the bioenhancer is (1~100) g:5000 mL; the molybdenum disulfide crystal phase with the above-mentioned enhancement characteristics includes 1T crystal phase and 2H crystal phase.

10 Claims, No Drawings

BIOENHANCER BASED ON MOLYBDENUM DISULFIDE COMPOSITE MATERIAL, PREPARATION METHOD AND APPLICATION THEREOF

CROSS-REFERENCE TO RELATED APPLICATIONS

This application claims priority to Chinese Patent Application No. 202410727582.7, filed on Jun. 6, 2024, the entire contents of which are incorporated herein by reference.

TECHNICAL FIELD

The present application relates to the technical field of biological denitrification of wastewater, and in particular to a bioenhancer based on a molybdenum disulfide composite material, a preparation method and an application thereof.

BACKGROUND

Biological denitrification technology has been widely used in wastewater treatment due to its high economic efficiency and environmental friendliness. Traditional biological denitrification mainly includes two stages: nitrification stage and denitrification stage. The nitrification stage is the conversion of ammonia nitrogen into $NO_2^-$ and $NO_3^-$ by aerobic autotrophic nitrifying bacteria, and then the denitrification stage is the reduction of $NO_2^-$ and $NO_3^-$ produced in the nitrification stage into $N_2$ by facultative heterotrophic denitrifying bacteria to achieve the denitrification process. In these two stages, a large amount of air and mud water return power consumption and the addition of exogenous organic carbon sources are required. Anaerobic ammonia oxidation (Anammox) process is a new denitrification technology. Its working principle is to use ammonia as an electron donor and nitrite as an electron acceptor under anaerobic conditions to directly produce $N_2$ to achieve total nitrogen (TN) removal. Because Anammox technology has the characteristics of anaerobic self-nutrition, compared with traditional biological denitrification technology, it can reduce more than 50% of aeration volume and 100% of organic carbon source, and the sludge yield is low. It is considered to be the most promising denitrification process. However, this technology has not been able to be promoted and applied on a large scale because it has strict requirements on the environment such as temperature and pH and its production is slow and difficult to cultivate.

In recent years, there have been many reports on improving the denitrification effect by strengthening biological methods. The related art reports an autotrophic denitrification bioreactor based on sulfur pyrite coupling filler and its application, and provides a coupling filler mixed with sulfur, pyrite and limestone, and denitrifying bacteria use the sulfur in the coupling filler for autotrophic denitrification to produce acidity. Under acidity, pyrite dissolves to produce negatively charged sulfur ions and ferrous ions, and limestone dissolves to produce carbonate ions, bicarbonate ions, calcium ions, etc. Negatively charged sulfur ions are easy to lose electrons, which can increase the rate at which the coupling filler provides electrons and form sulfides and polysulfides that are used by autotrophic denitrifying microorganisms. Ferrous ions and calcium ions will react with $SO_4^{2-}$ produced by sulfur autotrophic denitrification to generate calcium sulfate and ferrous sulfate precipitation in the reactor. In the related art, the denitrification rate is increased by electron donation by negatively charged sulfur ions. However, the generation of negatively charged sulfur ions depends on the dissolution of pyrite in the acidity generated by sulfur autotrophic denitrification of denitrifying bacteria. The process of generating negatively charged sulfur ions is relatively complicated, and the generation conditions are relatively harsh. For example, it will be limited by the dissolution rate of pyrite and the acidity of the environment. In addition, the sulfur, pyrite and limestone in the coupling filler are continuously consumed under acidity, and the raw materials need to be continuously replenished. In addition, additional wastes such as precipitation or waste residues such as calcium sulfate and ferrous sulfate will be generated, which increases the cleaning burden.

Therefore, there is an urgent need to develop a bioenhancer for biological denitrification, which can not only simply and effectively improve the denitrification effect, but also avoid additional material consumption and equipment cleaning operations to reduce operating costs.

SUMMARY

The objective of the present application is to overcome the shortcomings of the related art and provide a bioenhancer based on a molybdenum disulfide composite material, that is, molybdenum disulfide is used as an electron generation source and graphene is used as an electron conductor, which increases the exogenous electron input of cells in the activated sludge, thereby achieving the purpose of enhancing denitrification. The technology is easy to use, can effectively improve the biological denitrification effect, and can avoid the additional increase of consumable materials (such as carbon sources), thereby reducing operating costs.

In order to achieve the above objectives, the present application provides a bioenhancer based on a molybdenum disulfide composite material. The bioenhancer includes a molybdenum disulfide composite material and activated sludge. The ratio of the mass of the molybdenum disulfide composite material to the volume of the activated sludge in the bioenhancer is (1~100) g:5000 mL, and can be specifically (1~100) g:5000 mL, (2~100) g:5000 mL, (4~100) g:5000 mL, (6~100) g:5000 mL, (8~100) g:5000 mL, (10~100) g:5000 mL, (30~100) g:5000 mL, (50~100) g:5000 mL, (70~100) g:5000 mL, or (90~100) g:5000 mL.

The activated sludge comes from the biochemical system of the sewage treatment plant that needs to be enhanced, and can also come from the sludge of the biochemical system that treats wastewater of similar nature.

The sewage of the same nature is the sewage having the same nature as the wastewater to be treated. For example, if the wastewater to be treated is nitrogen-containing wastewater, the same type of wastewater is nitrogen-containing wastewater.

Activated sludge contains bacterial micelle, which are tiny particles composed of bacteria and other microorganisms and the colloid substances they secrete.

In an embodiment, the molybdenum disulfide composite material is prepared according to the following method:

subjecting a solution C containing ammonium molybdate tetrahydrate, thioacetamide, and graphene to hydrothermal treatment to obtain the molybdenum disulfide composite material.

In an embodiment, the mass ratio of the ammonium molybdate tetrahydrate, thioacetamide and graphene is 2.5:(1.5~2):(0.1~0.5).

In an embodiment, the hydrothermal treatment is conducted at a temperature of 180~400° C. for 18~32 hours.

In an embodiment, after the hydrothermal treatment, a cooling step and a washing step are further included; the cooling step includes: cooling to room temperature; and the washing step includes: washing with ultrapure water and ethanol alternately for 2 to 5 times.

In an embodiment, the solution C can be obtained by any of the following methods.

Method 1: dissolving ammonium molybdate tetrahydrate, thioacetamide and graphene in 30~50 mL of deionized water by sonication, and stirring for 5~15 minutes to obtain the solution C.

Method 2: dissolving ammonium molybdate tetrahydrate and thioacetamide in 20~45 mL of deionized water by sonication, and stirring for 5~15 minutes to obtain solution A;
  dissolving the graphene in 10~20 mL of deionized water by sonication, and stirring for 5~15 minutes to obtain solution B; and
  mixing the solution A and the solution B to obtain the solution C.

The deionized water is used to dissolve ammonium molybdate tetrahydrate, thioacetamide and graphene, and the amount of deionized water used will not affect the synthesis of the molybdenum disulfide composite material.

Considering the thorough mixing and contact of ammonium molybdate tetrahydrate, thioacetamide and graphene, the method 1 is used to prepare solution C.

In an embodiment, the molybdenum disulfide composite material includes molybdenum disulfide and graphene.

In an embodiment, the molybdenum disulfide includes molybdenum disulfide with a 1T crystal phase and molybdenum disulfide with a 2H crystal phase.

The present application further provides a method for preparing a bioenhancer based on a molybdenum disulfide composite material, including:
  mixing the molybdenum disulfide composite material with activated sludge;
  where a ratio of a mass of the molybdenum disulfide composite material to a volume of the activated sludge is (1~100) g:5000 mL.

In an embodiment, the ratio can be (1~100) g:5000 mL, (2~100) g:5000 mL, (4~100) g:5000 mL, (6~100) g:5000 mL, (8~100) g:5000 mL, (10~100) g:5000 mL, (30~100) g:5000 mL, (50~100) g:5000 mL, (70~100) g:5000 mL, and (90~100) g:5000 mL.

In an embodiment, a time of mixing the molybdenum disulfide composite material and activated sludge is 0.5 to 3 days.

In an embodiment, a temperature range for the mixing is 12~38° C.

In an embodiment, a temperature range for the mixing can also be 18~35° C.

In an embodiment, the intensity of the mixing is 50~100 $Nm^3/(m^2 \cdot h)$, and the mixing is continuous.

In an embodiment, the mixing method is aeration mixing or stirring mixing.

The stirring and mixing includes a first stirring (also called a fast stirring) and a second stirring (also called a slow stirring).

The stirring speed of the first stirring is 80~150 rpm, and the stirring time is 15~45 min.

The stirring speed of the secondary stirring is 50~80 rpm, and the stirring time is 0.5~3 days.

Based on the above, the stirring speed of the first stirring is relatively high and the time is relatively short, so that the molybdenum disulfide and graphene in the molybdenum disulfide composite material are quickly and fully mixed with the activated sludge; the stirring speed of the second stirring is relatively low and the time is relatively long, so that the mixing is fully uniform and the microorganisms in the activated sludge adapt to the molybdenum disulfide and graphene, and the molybdenum disulfide composite material and the bacterial micelle are better fused and fixed. Based on this, after the mixing is completed, the mixing intensity can be achieved to be 50~100 $Nm^3/(m^2 \cdot h)$.

The present application further provides an application of a bioenhancer based on a molybdenum disulfide composite material in nitrogen-containing wastewater.

In an embodiment, the bioenhancer is added to the biochemical system, and the volume ratio of the bioenhancer to the volume of the biochemical system is 1:10~1:100. In an embodiment, the volume ratio can be 1:20~1:100, 1:30~1:100, 1:40~1:100, 1:50~1:100, 1:60~1:100, 1:70~1:100, 1:80~1:100, 1:90~1:100. In an embodiment, 1:20~1:100 is adopted.

In an embodiment, subsequent maintenance steps are further included.

The subsequent maintenance step is: supplementing the bioenhancer to the biochemical system, where the ratio of the mass of the molybdenum disulfide composite material in the supplemented bioenhancer to the volume of the biochemical system is 1 g:10000 mL~1 g:500000 mL. In an embodiment, the ratio can be 1 g:10000 mL~1 g:500000 mL, 1 g:10000 mL~1 g:400000 mL, 1 g:10000 mL~1 g:300000 mL, 1 g:10000 mL~1 g:200000 mL, 1 g:10000 mL~1 g:100000 mL, and 1 g:10000 mL~1 g:50000 mL.

The interval between each subsequent maintenance step is 1 to 3 days.

According to a large number of experiments, the total nitrogen (TN) removal rate will usually drop below 50% after 1 to 3 days of operation, requiring subsequent maintenance steps; and the TN removal rate should be tested every 8 to 24 hours during operation.

The present application further provides an activated sludge strengthening method based on molybdenum disulfide composite materials, including: adding the molybdenum disulfide composite materials into a biochemical system, and the ratio of the mass of the molybdenum disulfide composite materials to the volume of the biochemical system is 1 g:5000 mL~1 g:50000 mL. In an embodiment, the ratio can be 1 g:5000 mL~1 g:50000 mL, 1 g:5000 mL~1 g:40000 mL, 1 g:5000 mL~1 g:30000 mL, 1 g:5000 mL~1 g:20000 mL, and 1 g:5000 mL~1 g:10000 mL.

In an embodiment, the method further includes enhanced maintenance steps.

The enhanced maintenance step includes: supplementing the molybdenum disulfide composite material into the biochemical system, where the ratio of the mass of the supplemented molybdenum disulfide composite material to the volume of the biochemical system is 1 g:10000 mL~1 g:500000 mL. In an embodiment, the ratio be 1 g:10000 mL~1 g:500000 mL, 1 g:10000 mL~1 g:400000 mL, 1 g:10000 mL~1 g:300000 mL, 1 g:10000 mL~1 g:200000 mL, 1 g:10000 mL~1 g:100000 mL, and 1 g:10000 mL~1 g:50000 mL.

The interval between each two intensive maintenance steps is 1 to 3 days.

According to a large number of experiments, the TN removal rate will drop below 45% after 1 to 3 days of operation, and enhanced maintenance steps are required; and the TN removal rate should be tested every 8 to 24 hours.

Compared with the related art, the technical solution provided by the present application possesses the following beneficial effects.

(1) The present application provides a bioenhancer, which includes a molybdenum disulfide composite material. When the bioenhancer is applied to the enhancement of nitrogen-containing wastewater and/or activated sludge, the molybdenum disulfide and graphene in the molybdenum disulfide composite material are fused and fixed with the bacterial micelle in the activated sludge. When the bioenhancer is applied to nitrogen-containing wastewater, the molybdenum disulfide has a piezoelectric self-driving characteristic. Under the action of hydraulic disturbance vibration, electrons can be generated and transferred to the surface of microbial cells or nitrate nitrogen molecules through graphene, thereby promoting the chemical reduction of nitrate nitrogen and biological denitrification, and has the effects of improving the efficiency of biological denitrification, reducing the addition of fillers and carbon sources, promoting the coagulation of bacterial micelle, and enhancing biochemical activity.

(2) The present application provides a method for preparing a bioenhancer based on a molybdenum disulfide composite material. The molybdenum disulfide and graphene in the molybdenum disulfide composite material can be fused and fixed with bacterial micelle in activated sludge, and the microorganisms in the activated sludge can be better adapted to the molybdenum disulfide and graphene, so as to improve the biological denitrification effect.

DETAILED DESCRIPTION OF THE EMBODIMENTS

The present application may be more easily understood by reference to the following description in conjunction with examples, all of which constitute a part of the present application. It should be understood that the present application is not limited to the specific products, methods, conditions or parameters described and/or illustrated herein. In an embodiment, the terms used herein are only used for the purpose of describing specific embodiments by way of example and are not intended to be limiting unless otherwise indicated.

It should also be understood that, for the sake of clarity, certain features of the present application may be described herein in the context of separate embodiments, but may also be provided in combination with each other in a single embodiment. That is, unless clearly incompatible or specifically not included, each separate embodiment is considered to be combinable with any other embodiment, and the combination is considered to represent another different embodiment. Conversely, for the sake of simplicity, the various features of the present application described in the context of a single embodiment may also be provided individually or in any sub-combination. Finally, although a particular embodiment may be described as part of a series of steps or part of a more general structure, each step or substructure itself may also be considered to be an independent embodiment.

Unless otherwise indicated, it should be understood that each individual element in a list and each combination of individual elements in the list will be interpreted as a different embodiment. For example, a list of embodiments represented as "A, B, or C" should be interpreted to include embodiments "A", "B", "C", "A or B", "A or C", "B or C", or "A, B, or C".

In the present application, the singular forms of the articles "a," "an," and "the" further include the corresponding plural references, and a reference to a specific value includes at least that specific value unless the context clearly indicates otherwise. Thus, for example, a reference to "a substance" is a reference to at least one of that substance and its equivalents.

Terms including ordinal numbers such as "first" and "second" can be used to explain various components or fluids, but these components and fluids are not limited by these terms. Therefore, without departing from the teachings of the present application, these terms are only used to distinguish the component/fluid from another component/fluid.

When items are described by using the conjunction terms "... and/or ...," etc., the description should be understood to include any one of the associated listed items and all combinations of one or more thereof.

In general, the use of the term "about" indicates an approximate value that may vary depending on the desired properties obtained by the disclosed subject matter, and will be interpreted in a context-dependent manner based on function. Therefore, one of those skilled in the art will be able to interpret a certain degree of difference on a case-by-case basis. In some cases, the number of significant figures used when expressing a particular value can be a representative technique for determining the difference allowed by the term "about". In other cases, a gradient in a range of values can be used to determine the range of differences allowed by the term "about". In an embodiment, all ranges in this disclosure are inclusive and combinable, and reference to a value in a range includes each value within that range.

Unless otherwise defined, all technical and scientific terms used herein have the same meaning as commonly understood by one of those skilled in the art to which the application belongs; the terms used herein and/or include any and all combinations of one or more of the associated listed items.

In the following examples, if no specific conditions are specified, the experiments were carried out under conventional conditions or conditions recommended by the manufacturer. The reagents or instruments used, if no manufacturer is specified, are all conventional products that can be purchased commercially.

The present application is further described below with reference to specific examples, but the examples do not limit the present application in any form. Unless otherwise specified, the reagents, methods and equipment used in the present application are conventional reagents, methods and equipment in the present technical field. The essential features and remarkable effects of the present application can be reflected in the following embodiments. The described embodiments are part of the embodiments of the present application, but not all of the embodiments. Therefore, they do not limit the present application in any way. Those skilled in the art may make some non-essential improvements and adjustments based on the contents of the present application, which all fall within the protection scope of the present application.

Embodiment 1

In this embodiment, a bioenhancer is provided, which includes a molybdenum disulfide composite material and activated sludge. The ratio of the molybdenum disulfide composite material to the activated sludge in the bioenhancer is 1 g:1000 mL.

Based on this, this embodiment further provides a specific method for preparing the above-mentioned bioenhancer.

S1, preparing molybdenum disulfide composite material: dissolving ammonium molybdate tetrahydrate (2.5 g), thioacetamide (1.5 g) and graphene (0.1 g) in 35 mL of deionized water by sonication and stirring for 15 minutes to obtain solution C; transferring solution C to a polytetrafluoroethylene liner in an autoclave and heating at 200° C. for 24 hours; after cooling to room temperature, washing alternately three times by ultra-pure water and ethanol to obtain a molybdenum disulfide composite material.

S2, preparing the bioenhancer:

preparing a bioenhancer based on the molybdenum disulfide composite material prepared in step S1: stirring and mixing, at about 25° C. (normal temperature), the molybdenum disulfide composite material and activated sludge (activated sludge from the anoxic biochemical section of the pharmaceutical wastewater biochemical treatment system) at a ratio of 1 g:1000 mL, where the composite material and the activated sludge are first rapidly stirred and mixed at a stirring speed of 150 rpm for 0.5 h, and then slowly stirred at a stirring speed of 80 rpm for 24 h to obtain a bioenhancer labeled MSC-B-1.

Comparative Example 1-1

This comparative example is basically the same as the above-mentioned embodiment 1, except that step S1.

In S1 described in this comparative example, graphene is not added in the process of preparing the molybdenum disulfide composite material, to obtain the molybdenum disulfide composite material.

Finally, the corresponding bioenhancer was prepared based on the molybdenum disulfide composite material obtained in this comparative example, and was labeled D-MSC-B-1.

Embodiment 2

This embodiment is basically the same as the above-mentioned Embodiment 1, except that in step S2: the mixing ratio of the molybdenum disulfide composite material and the activated sludge is 1 g:200 mL, and finally a bioenhancer is obtained, which is labeled MSC-B-2.

Embodiment 3

This embodiment is basically the same as the above-mentioned Embodiment 1, except that in step S2: the mixing ratio of the molybdenum disulfide composite material and the activated sludge is 1 g:50 mL, and finally a bioenhancer is obtained, which is labeled MSC-B-3.

Comparative Example 1-2

This comparative example is basically the same as the above-mentioned Embodiment 1, except that in step S2: the mixing ratio of the molybdenum disulfide composite material and the activated sludge is 1 g:7000 mL, and the bioenhancer is finally obtained, which is labeled D-MSC-B-2.

Comparative Examples 1-3

This comparative example is basically the same as the above-mentioned Embodiment 1, except that in step S2: the mixing ratio of the molybdenum disulfide composite material and the activated sludge is 1 g:10 mL, and finally a bioenhancer is obtained, which is labeled D-MSC-B-3.

Embodiment 4

Based on the above embodiments and comparative examples, the prepared bioenhancer is applied to the denitrification of nitrogen-containing wastewater. The specific process is: adding the bioenhancer to the anoxic biochemical section of the biochemical system, the volume ratio of the bioenhancer to the volume of the biochemical system is 1:80, where the volume of the biochemical system is 1 L, which is used to simulate the biological denitrification of wastewater. The influent total nitrogen (TN) is 56 mg/L, the residence time is 16 hours, the temperature is room temperature (about 22° C.), and the supernatant of the effluent is taken for nitrogen-related indicators testing.

TABLE 1

Treatment results of nitrogen-containing wastewater with different bioenhancers

| Bioenhancer | MSC-B-1 | MSC-B-2 | MSC-B-3 | D-MSC-B-1 | D-MSC-B-2 | D-MSC-B-3 |
| --- | --- | --- | --- | --- | --- | --- |
| Inlet TN (mg/L) | 56 | 56 | 56 | 56 | 56 | 56 |
| Outlet TN (mg/L) | 25 | 10 | 7 | 43 | 39 | 6 |
| TN removal rate | 55.4% | 82.1% | 87.5% | 23.2% | 30.4% | 89.3% |

According to the data in Table 1, based on the experimental data of bioenhancers MSC-B-1 and D-MSC-B-1, it can be seen that when graphene is not added to the molybdenum disulfide composite material, the TN removal effect is poor due to the lack of graphene for electron transfer. Based on the experimental data of bioenhancers MSC-B-1, MSC-B-2 and MSC-B-3, as the amount of molybdenum disulfide composite material in the bioenhancer increases, the TN removal rate shows a trend of gradual increase. Combined with the data of bioenhancers D-MSC-B-2 and D-MSC-B-3, when the amount of molybdenum disulfide composite material in the bioenhancer is small, molybdenum disulfide produces fewer electrons, resulting in poor denitrification effect. When the amount of molybdenum disulfide composite material in the bioenhancer is large, the denitrification effect is only slightly improved, but the treatment cost is greatly increased.

Comparative Example 4-1

The method is basically the same as Embodiment 4, except that no bioenhancer is added to the biochemical system. The TN removal rate achieved is 12%.

It can be seen that when no bioenhancer is added, the denitrification effect is poor.

Embodiment 5

Subsequent maintenance steps: Based on the application of the bioenhancer MSC-B-1 prepared in Embodiment 4 to the denitrification of nitrogen-containing wastewater, the TN removal rate is detected every 8 hours. After operating for 24 hours, when subsequent maintenance steps are required, the bioenhancer is supplemented to the biochemical system every day. The ratio of the mass of the molybdenum disulfide composite material in the supplemented bioenhancer to the volume of the biochemical system is 1 g:100000 mL, and the denitrification removal rate of the biochemical system can be maintained at 52%~61% every day.

Embodiment 6

The method of directly performing activated sludge strengthening using the molybdenum disulfide composite material prepared by step S1 in the above embodiment 1, the specific process is: adding the molybdenum disulfide composite material to the anoxic biochemical section of the biochemical system, the ratio of the mass of the molybdenum disulfide composite material to the volume of the biochemical system is 1 g:16000 mL, where the volume of the biochemical system is 1 L, which is used to simulate the biological denitrification of wastewater. The influent TN is 56 mg/L, the residence time is 16 hours, the temperature is room temperature (about 22° C.), and the supernatant of the effluent is obtained for nitrogen-related indicators testing, the effluent TN is 12 mg/L, and the TN removal rate is 78.6%.

Embodiment 7

Based on the molybdenum disulfide composite activated sludge enhancement method in Embodiment 6, the TN removal rate is detected every 8 hours. After operating for 24 hours, when the enhanced maintenance step is required, the molybdenum disulfide composite material is supplemented to the biochemical system every day. The ratio of the mass of the supplemented molybdenum disulfide composite material to the volume of the biochemical system is 5 g:1000000 mL, and the denitrification removal rate of the biochemical system can be maintained at 71%~83% every day.

It should be understood that those skilled in the art will recognize that some variations that can be directly derived or associated from the disclosure of the present application and common knowledge under the motivation from the concept of the present application and its particular examples, those skilled in the art will recognize that. Other methods, or alternatives to well-known techniques commonly used in the related art, and insubstantial modifications of different combinations of features, etc., can be applied as well, and the functions and effects described in the present application can be implemented, and examples will not be explained in detail but is within the scope of the present application.

What is claimed is:

1. A bioenhancer based on a molybdenum disulfide composite material, comprising: the molybdenum disulfide composite material and activated sludge, wherein a ratio of a mass of the molybdenum disulfide composite material to a volume of the activated sludge is (1~100) g:5000 mL;
   and the molybdenum disulfide composite material is prepared by:
   subjecting a solution containing ammonium molybdate tetrahydrate, thioacetamide, and graphene to hydrothermal treatment;
   wherein a mass ratio of ammonium molybdate tetrahydrate, thioacetamide, and graphene is 2.5:(1.5~2):(0.1~0.5);
   the hydrothermal treatment is conducted at a temperature of 180~400° C. for 18~32 hours;
   the molybdenum disulfide composite material comprises molybdenum disulfide and graphene; and
   the molybdenum disulfide comprises molybdenum disulfide with a 1T crystal phase and molybdenum disulfide with a 2H crystal phase.

2. An application of the bioenhancer based on the molybdenum disulfide composite material according to claim 1 in nitrogen-containing wastewater, comprising:
   adding the bioenhancer into a biochemical system, wherein a volume ratio of the bioenhancer to the biochemical system is 1:10 to 1:100.

3. The application according to claim 2, further comprising subsequent maintenance steps:
   supplementing the bioenhancer to the biochemical system, wherein a ratio of a mass of the molybdenum disulfide composite material in the supplemented bioenhancer to a volume of the biochemical system is 1 g:10000 mL to 1 g:500000 mL; and
   wherein an interval between each subsequent maintenance step is 1 to 3 days.

4. A method for preparing a bioenhancer based on a molybdenum disulfide composite material, comprising:
   mixing the molybdenum disulfide composite material with activated sludge;
   wherein the molybdenum disulfide composite material comprises molybdenum disulfide and graphene, and a ratio of a mass of the molybdenum disulfide composite material to a volume of the activated sludge is (1~100) g:5000 mL.

5. The method according to claim 4, wherein a time of mixing the molybdenum disulfide composite material and the activated sludge is 0.5 to 3 days.

6. The method according to claim 4, wherein:
   an intensity of the mixing is 50~100 Nm$^3$/(m$^2$·h), and the mixing is continuous.

7. An application of the bioenhancer prepared by the method according to claim 4 in nitrogen-containing wastewater, wherein:
   adding the bioenhancer into a biochemical system, wherein a volume ratio of the bioenhancer to the biochemical system is 1:10 to 1:100.

8. The application according to claim 7, further comprising subsequent maintenance steps:
   supplementing the bioenhancer to the biochemical system, wherein a ratio of a mass of the molybdenum disulfide composite material in the supplemented bioenhancer to a volume of the biochemical system is 1 g:10000 mL to 1 g:500000 mL; and
   wherein an interval between each subsequent maintenance step is 1 to 3 days.

9. An activated sludge strengthening method based on a molybdenum disulfide composite material, comprising:
   adding the molybdenum disulfide composite material into an anoxic biochemical section of a biochemical system, wherein a ratio of a mass of the molybdenum disulfide composite material to a volume of the biochemical system is 1 g:5000 mL to 1 g:50000 mL; and
   wherein the molybdenum disulfide composite material is prepared by:
   subjecting a solution containing ammonium molybdate tetrahydrate, thioacetamide, and graphene to hydrothermal treatment;

wherein a mass ratio of ammonium molybdate tetrahydrate, thioacetamide, and graphene is 2.5:(1.5~2):(0.1~0.5);

the hydrothermal treatment is conducted at a temperature of 180~400° C. for 18~32 hours;

the molybdenum disulfide composite material comprises molybdenum disulfide and graphene; and the molybdenum disulfide comprises molybdenum disulfide with a 1T crystal phase and molybdenum disulfide with a 2H crystal phase.

10. The method according to claim 9, further comprising enhanced maintenance steps, wherein the enhanced maintenance steps comprise:

adding the molybdenum disulfide composite material to the biochemical system, wherein a ratio of a mass of the molybdenum disulfide composite material to a volume of the biochemical system is 1 g:10000 mL to 1 g:500000 mL; and wherein an interval between each two enhanced maintenance steps is 1 to 3 days.

* * * * *